(12) United States Patent
Nakashima et al.

(10) Patent No.: US 9,007,492 B2
(45) Date of Patent: Apr. 14, 2015

(54) IMAGE PROCESSING DEVICE AND IMAGING DEVICE

(71) Applicant: Panasonic Corporation, Osaka (JP)

(72) Inventors: Toshiyuki Nakashima, Hyogo (JP); Takeshi Hamasaki, Osaka (JP); Tadashi Nagai, Osaka (JP); Koichi Toyomura, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 110 days.

(21) Appl. No.: 13/727,477

(22) Filed: Dec. 26, 2012

(65) Prior Publication Data

US 2013/0194460 A1 Aug. 1, 2013

(30) Foreign Application Priority Data

Feb. 1, 2012 (JP) ................................. 2012-019483

(51) Int. Cl.
*H04N 5/217* (2011.01)
*H04N 5/335* (2011.01)
*H04N 5/357* (2011.01)
*H04N 5/21* (2006.01)

(52) U.S. Cl.
CPC . *H04N 5/357* (2013.01); *H04N 5/21* (2013.01)

(58) Field of Classification Search
CPC . H04N 5/33; H04N 13/0022; H04N 13/0271; H04N 2013/0081; H04N 13/0018; H04N 1/00307; H04N 2101/00; H04N 5/144; H04N 5/213; H04N 5/23229; H04N 5/247; H04N 5/3532; H04N 9/646; Y10S 901/47

USPC ................................... 348/241, 280; 382/195
See application file for complete search history.

(56) References Cited

U.S. PATENT DOCUMENTS

| 2010/0195926 A1* | 8/2010 | Sasaki ........................... 382/260 |
| 2011/0134292 A1* | 6/2011 | Hirai ............................. 348/280 |
| 2012/0189208 A1* | 7/2012 | Inaba et al. ................... 382/195 |

FOREIGN PATENT DOCUMENTS

| JP | 05-300409 A | 11/1993 |
| JP | 2007-096675 A | 4/2007 |
| JP | 2010-039832 A | 2/2010 |
| JP | 2011-065339 A | 3/2011 |

* cited by examiner

*Primary Examiner* — Trung Diep (74) *Attorney, Agent, or Firm* — McDermott Will & Emery LLP (57) ABSTRACT

Provided is an image processing device including: a 3D-NR unit that performs, using first image data and second image data obtained by capturing images at temporally different times, 3D noise reduction (NR) processing for reducing noise in the first image data; an edge detection unit that detects an edge strength in an image indicated by the 3D-NR processed image data; and a synthesization unit that determines, based on the detected edge strength obtained by the edge detection unit, a synthesis ratio of the first image data and the 3D-NR processed image data, synthesizes the first image data and the 3D-NR processed image data, using the determined synthesis ratio, and outputs synthesized image data obtained by synthesizing the first image data and the 3D-NR processed image data.

8 Claims, 10 Drawing Sheets

IMAGE PROCESSING DEVICE AND IMAGING DEVICE

CROSS REFERENCE TO RELATED APPLICATION

The present application is based on and claims priority of Japanese Patent Application No. 2012-019483 filed on Feb. 1, 2012. The entire disclosure of the above-identified application, including the specification, drawings and claims is incorporated herein by reference in its entirety.

FIELD

The present disclosure relates to image processing devices, and, in particular, to an image processing device which can perform three-dimensional noise reduction (3D-NR) processing on an inputted image.

BACKGROUND

PTL 1 discloses an image processing device which can perform the 3D-NR processing on an inputted image. The image processing device can output an image obtained by performing sharpening processing on edge portions in the inputted image and performing the 3D-NR processing on image regions other than the edge portions in the inputted image.

This allows the image processing device to reduce random noise in the image regions other than the edge portions in the inputted image.

CITATION LIST

Patent Literature

[PTL 1] Japanese Unexamined Patent Application Publication No. 2011-65339

SUMMARY

Technical Problem

However, when the 3D-NR processing is performed in a manner as the conventional image processing device described above performs the 3D-NR processing on, for example, an image having a small edge strength such as an image obtained by capturing a moving subject, there arises a problem that residual image is rather prominent in the processed image.

One non-limiting and exemplary embodiment provides an image processing device which performs the 3D-NR processing on an inputted image and outputs a resultant image in consideration of the above described conventional problems, and allows suppression of the occurrence of residual image in an outputted image.

Solution to Problem

To solve the above problem, the image processing device according to one aspect of the present disclosure is an image processing device including: an image processor that: (i) performs, using first image data and second image data obtained by capturing images at temporally different times, three-dimensional noise reduction (3D-NR) processing for reducing noise in the first image data; (ii) detects an edge strength in an image indicated by the 3D-NR processed image data; (iii) determines, based on the detected edge strength, a synthesis ratio of the first image data and the 3D-NR processed image data; and (iv) synthesizes the first image data and the 3D-NR processed image data, using the determined synthesis ratio and outputs synthesized image data obtained by synthesizing the first image data and the 3D-NR processed image data.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Advantageous Effects

According to the present disclosure, the image processing device can be provided which performs the 3D-NR processing on an inputted image, outputs a resultant image, and allows suppression of the occurrence of residual image in an outputted image. Moreover, an imaging device including the image processing device can be provided.

BRIEF DESCRIPTION OF DRAWINGS

These and other objects, advantages and features of the invention will become apparent from the following description thereof taken in conjunction with the accompanying drawings that illustrate a specific embodiment of the present disclosure.

DESCRIPTION OF EMBODIMENT

In relation to the conventional techniques, the inventors have found the following problems:

For example, in a plurality of images which are taken by a static camera and in which a moving object is captured, the object is blurred and thus the edge strength in the images at which the object is displayed has a relatively small value.

Thus, the conventional image processing device performs the 3D-NR processing on the image of the object. In other words, processing occurs which synthesizes a plurality of images having residual images added thereto and in which the position of the object is different. As a result, there arises a problem that the 3D-NR processed image shows stronger residual images than the image before the 3D-NR processing is performed thereon.

To solve such a problem, an image processing device according to one aspect of the present disclosure is an image processing device including: an image processor that: (i) performs, using first image data and second image data obtained by capturing images at temporally different times, three-dimensional noise reduction (3D-NR) processing for reducing noise in the first image data; (ii) detects an edge strength in an image indicated by the 3D-NR processed image data; (iii) determines, based on the detected edge strength, a synthesis ratio of the first image data and the 3D-NR processed image data; and (iv) synthesizes the first image data and the 3D-NR processed image data, using the determined synthesis ratio and outputs synthesized image data obtained by synthesizing the first image data and the 3D-NR processed image data.

According to the above configuration, the first image data and the processed image data that is obtained by performing the 3D-NR processing on the first image data are synthesized using the synthesis ratio determined by the synthesization unit.

Specifically, the synthesis ratio is determined based on the edge strength in an image indicated by the processed image data. Thus, for example, when the edge strength is relatively small, such as the case where the image indicated by the processed image data is a portion of the residual image of the subject, controls is possible such as reducing the proportion of the processed image data in the synthesization. As a result, the occurrence of residual image in an image to be outputted is suppressed.

Moreover, for example, when the detected edge strength indicates a second edge strength greater than a first edge strength, the image processor may determine a proportion of the 3D-NR processed image data indicated in the synthesis ratio to have a greater value than a proportion when the detected edge strength indicates the first edge strength.

According to the above configuration, for example, in each case where the edge strength is relatively large and where the edge strength is relatively small, the suppression of residual image caused by the 3D-NR processing and reduction of noise by the 3D-NR processing are achieved in a balanced manner.

Moreover, for example, the image processor may determine the synthesis ratio to have a greater proportion of the 3D-NR processed image data indicated in the synthesis ratio as the edge strength indicated in the detected edge strength increases.

According to the above configuration, the suppression of residual image caused by the 3D-NR processing and reduction of noise by the 3D-NR processing are achieved in a balanced manner, in accordance with, for example, the edge strength that can vary.

Moreover, for example, when a brightness indicated in the 3D-NR processed image data is a second brightness lower than a first brightness, the image processor may determine the proportion of the 3D-NR processed image data in the synthesis ratio that corresponds to the detected edge strength to have a greater value than the proportion when the brightness is the first brightness.

According to the above configuration, for example, even when the outline of the subject is not sharp due to dark image-capturing environment, the synthesized image data in which noise in the outline portion is reduced by the 3D-NR processing is outputted.

Moreover, for example, the first image data may be image data in a predetermined unit that is included in one of two frames obtained by capturing the images at temporally different times and the second image data may be image data in the predetermined unit that is included in the other of the two frames, and the image processor may, for each predetermined unit, determine the synthesis ratio and synthesize the first image data and the 3D-NR processed image data to output synthesized image data corresponding to the one of the two frames.

According to the above configuration, for example, image data which makes up a picture and in which at least one of the suppression of residual image and the reduction of noise is appropriately performed for each region is outputted as the synthesized image data.

Moreover, for example, the image processor may perform the 3D-NR processing, using processed image data that is the second image data and has been outputted from the image processor before the 3D-NR processing is performed on the first image data.

According to the above configuration, the image processor can use image data already obtained by previous 3D-NR processing to perform the 3D-NR processing on the first image data which is a current target to be processed. As a result, for example, effects of suppressing the occurrence of noise in the synthesized image data increase.

Moreover, an imaging device according to one aspect of the present disclosure includes: the image processing device according to any of aspects described above; and an image sensor that captures images to obtain the first image data and the second image data.

According to the above configuration, an imaging device can be achieved which reduces noise, using the 3D-NR processing and allows suppression of the occurrence of residual image in an image to be outputted or stored.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Embodiment

Hereinafter, an image processing device according to an embodiment will be described with reference to the accompanying drawings. It should be noted that figures are schematic views and do not necessarily illustrate the present disclosure precisely.

It should be noted that the embodiment described below is merely a preferred illustration of the present disclosure. Values, shapes, materials, components, disposition or a form of connection between the components, steps, and the order of the steps are merely illustrative, and are not intended to limit the present disclosure. Moreover, among components of the below non-limiting embodiments, components not set forth in the independent claims indicating the top level concept of the present disclosure will be described as optional components.

1-1. Configuration

First, a configuration of a digital video camera 100 according to the present embodiment will be described with reference to FIG. 1.

Figure 1:
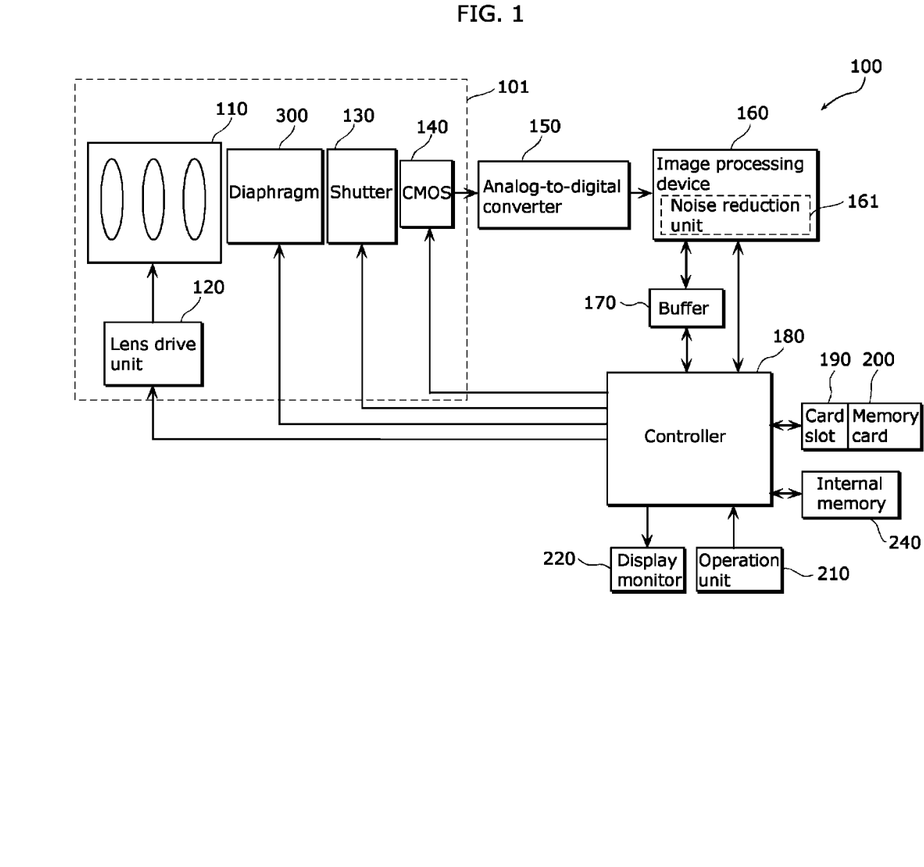
FIG. 1 is a block diagram of an example of configuration of a digital video camera.

FIG. 1 is a block diagram showing an example of the configuration of the digital video camera 100 according to the embodiment.

The digital video camera 100 includes an imaging unit 101 and an image processing device 160.

The imaging unit 101 includes an optical system 110, a lens drive unit 120, a diaphragm 300, a shutter 130, and a CMOS (Complementary Metal Oxide Semiconductor) image sensor 140.

In the imaging unit 101, the CMOS image sensor 140 captures a subject image formed by the optical system 110 which includes one or more lens.

Image data generated by the CMOS image sensor 140 undergoes various processing by the image processing device 160, and is stored in a memory card 200. Hereinafter, the configuration of the digital video camera 100 will be described in detail.

The optical system 110 includes a zoom lens, a focus lens, and the like. Moving the zoom lens along with the optical axis can enlarge and reduce the subject image. Moving the focus lens along with the optical axis can adjust the focus of the subject image.

The lens drive unit 120 drives movement of various lens included in the optical system 110. The lens drive unit 120 includes, for example, a zoom motor which drives the zoom lens and a focus motor which drives the focus lens.

The diaphragm 300 adjusts the size of aperture manually or in accordance with user settings, to adjust the amount of light passing through the aperture of the diaphragm 300.

The shutter 130 blocks light reaching the CMOS image sensor 140 via the shutter 130.

The CMOS image sensor 140 captures the subject image formed by the optical system 110 to generate image data. The CMOS image sensor 140 performs various operations of exposure, transfer, an electronic shutter, and the like.

An analog-to-digital converter 150 converts analog image data generated by the CMOS image sensor 140 into digital image data.

The image processing device 160 performs various processing on the image data (more specifically, referring to digital image data that has undergone conversion by the analog-to-digital converter 150, hereinafter,) generated by the CMOS image sensor 140 to generate image data to be displayed on a display monitor 220, generate image data to be stored in the memory card 200, and the like.

The image processing device 160 performs various processing on the image data generated by the CMOS image sensor 140, such as gamma correction, white balance correction, and the defect correction.

Moreover, the image processing device 160 compresses the image data generated by the CMOS image sensor 140 in a compression format complying with the H.264 standard or the MPEG2 standard.

The image processing device 160 according to the present embodiment includes a noise reduction unit 161, as a characteristic functional configuration, which performs processing, including the 3D-NR processing, on the image data to reduce noise and residual images. The noise reduction unit 161 will be described in detail below, with reference to FIG. 2.

It should be noted that the image processing device 160 can be achieved using digital signal processor (DSP), a microcomputer, or the like.

A controller 180 controls the entirety of the digital video camera 100. The controller 180 can be achieved using a semiconductor device, or the like. Alternatively, the controller 180 may be achieved using hardware or a combination of hardware and software. The controller 180 can be achieved using the microcomputer or the like.

A buffer 170 serves as a work memory of the image processing device 160 and the controller 180. The buffer 170 can be implemented as, for example, DRAM or a ferroelectric memory.

A card slot 190 is a device to/from which the memory card 200 can be inserted/removed. Specifically, the card slot 190 is mechanically and electrically connectable with the memory card 200.

The memory card 200 includes a flash memory, a ferroelectric memory, or the like therein and can store the image data generated by the image processing device 160, and the like.

An internal memory 240 is a flash memory, a ferroelectric memory, or the like. The internal memory 240 stores a control program or the like for controlling the entirety of the digital video camera 100.

An operation unit 210 is a user interface for receiving operations from a user. The operation unit 210 includes, for example, a cursor pad, a decision button, and the like for receiving operations from a user.

The display monitor 220 can display an image (a through image) indicated by the image data generated by the CMOS image sensor 140 and an image indicated by the image data read out from the memory card 200. In addition, the display monitor 220 can display various menu screens whereby the various settings of the digital video camera 100 are made.

1-2. Noise Reduction Unit Included in Image Processing Device

Figure 2:
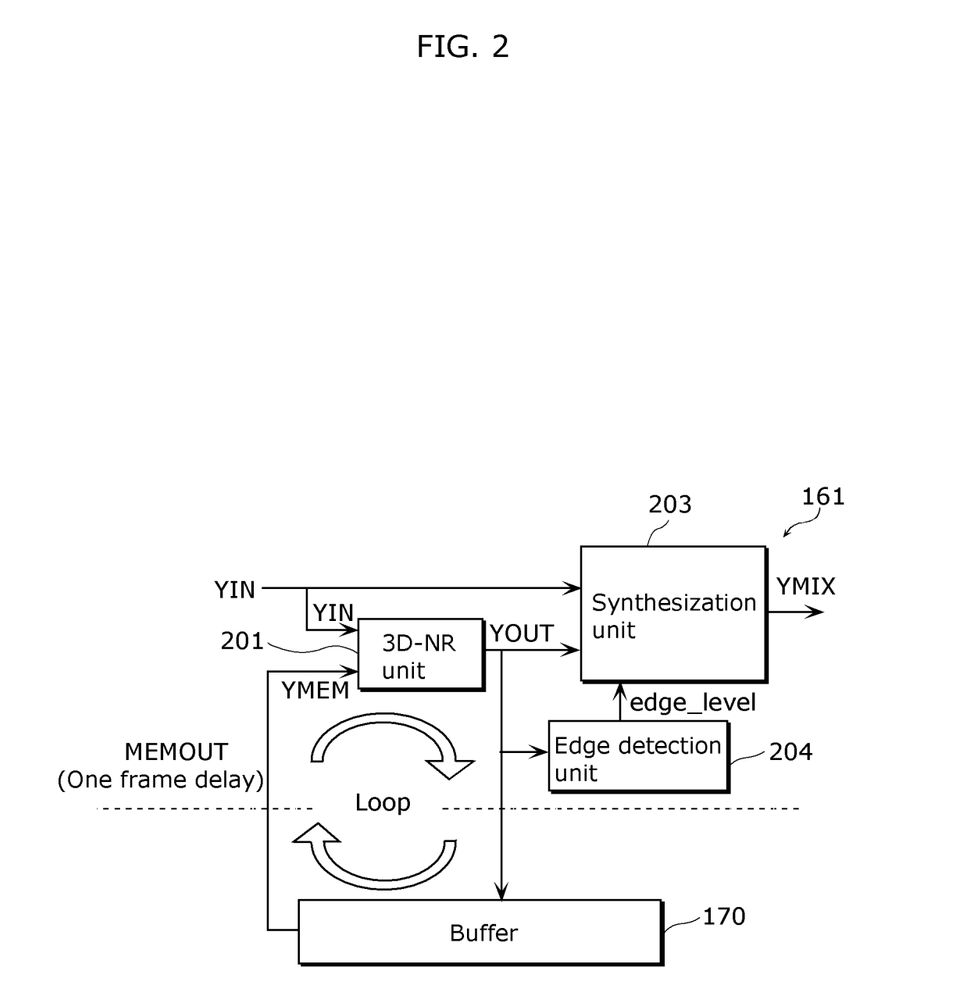
FIG. 2 is a diagram showing an example of a functional configuration of a noise reduction unit.

FIG. 2 is a diagram showing an example of a functional configuration of the noise reduction unit 161 included in the image processing device 160 according to the embodiment.

The noise reduction unit 161 included in the image processing device 160 according to the present embodiment will be described with reference to FIG. 2.

A 3D-NR unit 201 is by way of example of an image processing unit for performing the 3D-NR processing. In the 3D-NR unit 201, calculation shown in Equation 1 is performed as the 3D-NR processing to reduce, from image data (referred to as YIN and YMEM) corresponding to inputted two frames, a noise component of YIN. As a result of the calculation, YOUT by way of example of the processed image data is outputted from the 3D-NR unit 201.

YIN is by way of example of first image data. In the present embodiment, YIN is image data obtained by the analog-to-digital converter 150 converting the image data generated by the CMOS image sensor 140 into digital image data. It should be noted that the image processing device 160 may perform predetermined processing such as the gamma correction on YIN prior to being inputted to the 3D-NR unit 201 and a synthesization unit 203.

YMEM is by way of example of second image data. YMEM is image data to be read out from the buffer 170 in the present embodiment. In other words, YMEM is image data that has been outputted from the 3D-NR unit 201 before the 3D-NR processing is performed on YIN, and stored in the buffer 170. In other words, YMEM is past YOUT.

$$YOUT = YIN - \alpha(YIN - YMEM) \quad \text{Eq. 1}$$

where $\alpha$ is any value greater than or equal to 0 and less than or equal to 1, and is a variable whereby the strength of the noise reduction effect is determined.

Next, the principle of how noise is reduced by Equation 1 will be described. The case is assumed where YIN contains noise and YMEM is noiseless.

In this case, YOUT approximates to YMEM by subtracting the component $\alpha(YIN - YMEM)$ from YIN. As a result, the noise component is reduced.

For example, the case is assumed where an original image data value of YIN=100, the noise component added to YIN=20, and an image data value of YMEM=100 (assuming noiseless).

In this case, when α=0.5, YOUT=120−0.5 (120−100)=110 is satisfied. Thus, the noise component can be reduced.

The synthesization unit 203 synthesizes the image data (YIN and YOUT) corresponding to the inputted two frames, using a synthesis ratio (β:1−β) determined by the synthesization unit 203 as shown in Equation 2.

In other words, YIN (the first image data) and YOUT (the processed image data) are synthesized in the ratio of β:1−β.

In other words, as a value of β increases, a proportion of YIN in YMIX to be outputted from the synthesization unit 203 increases and a proportion of YOUT in YMIX decreases. It should be noted that YMIX is by way of example of the synthesized image data.

$$YMIX=\beta YIN+(1-\beta) YOUT \qquad \text{Eq. 2}$$

The edge detection unit 204 detects the edge strength in the image indicated by the inputted image data YOUT.

Specifically, the edge detection unit 204 extracts an edge component which is included in the image indicated by the inputted image data YOUT. In extraction of the edge component, for example, the convolution operation for an edge detection filter (such as Sobel filter or Laplacian filter) is performed on the image data YOUT, and, as a result of the calculation, the edge strength in the image data is outputted from the edge detection unit 204.

The synthesization unit 203 determines the synthesis ratio (β:1−β), based on the detection result obtained by the edge detection unit 204.

1-3. Data Flow

Data and processing flow of the noise reduction unit 161 included in the image processing device 160 according to the present embodiment will be described with reference to FIG. 2 and FIG. 3.

Figure 3:
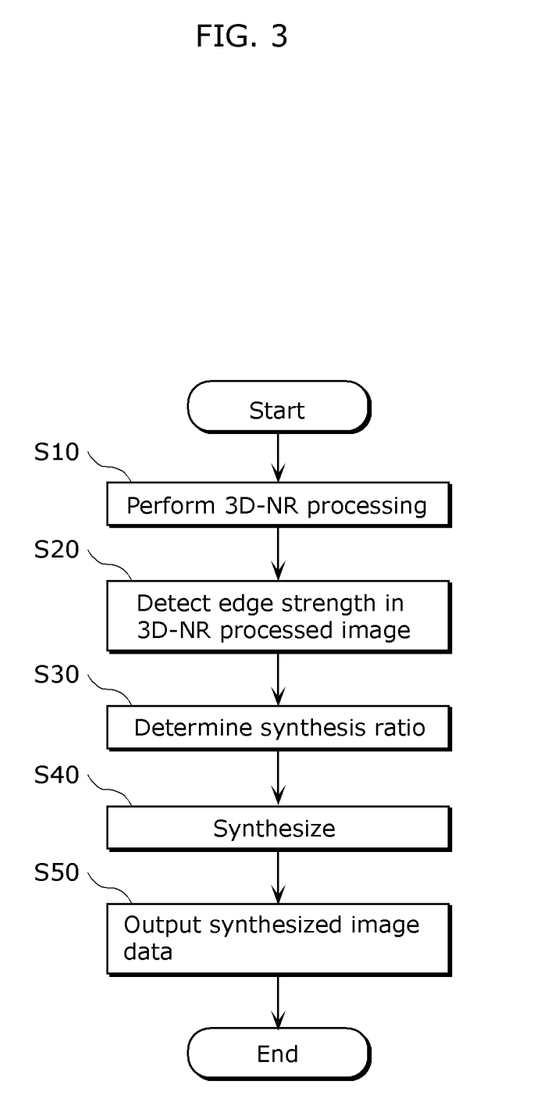
FIG. 3 is a flowchart illustrating processing flow of the noise reduction unit.

FIG. 3 is a flowchart illustrating an example of the processing flow of the noise reduction unit 161 included in the image processing device 160 according to the present embodiment.

The image data YIN inputted from the analog-to-digital converter 150 to the image processing device 160 and the image data YMEM outputted from the buffer 170 are inputted to the 3D-NR unit 201.

The 3D-NR unit 201 performs the noise reduction processing (the 3D-NR processing) on the image data YIN by making the calculation shown in Equation 1 (S10). YOUT, which is the processed image data obtained by the 3D-NR processing, is inputted to the synthesization unit 203, the edge detection unit 204, and the buffer 170.

The edge detection unit 204 detects the edge strength in an image indicated by the image data YOUT inputted from the 3D-NR unit 201 (S20). The detection result is inputted to the synthesization unit 203.

The synthesization unit 203 determines the synthesis ratio (β:1−β) in Equation 2, in accordance with the edge strength indicated in the detection result inputted from the edge detection unit 204 (S30).

It should be noted that the edge detection unit 204 determines, for example, β greater than or equal to 0 and less than and equal to 1, thereby determining the synthesis ratio (β:1−β). In other words, β and 1−β are variables in a relationship that when one of β and 1−β is determined, the other is determined. Thus, a fact that one of β and 1−β is determined means that the synthesis ratio (β:1−β) is determined.

Using the determined synthesis ratio, the synthesization unit 203 synthesizes the image data YIN and the image data YOUT which is inputted from the 3D-NR unit 201 (S40).

The synthesization unit 203 outputs image data YMIX obtained by synthesizing the image data YIN and the image data YOUT (S50). In other words, the image data YMIX is handled, by the digital video camera 100, as image data outputted from the noise reduction unit 161 included in the image processing device 160.

It should be noted that, specifically, in the present embodiment, the series of processing steps shown in FIG. 3 is performed in predetermined units such as every pixel and every block of pixels.

For example, if the predetermined unit is a block of n pixels×m pixels (where n and m are integers greater than or equal to 2), an average or sum of the edge strength each calculated for each pixel, or the edge strength in a portion of the pixels included in the block is handled as the edge strength corresponding to the block.

In other words, the 3D-NR processing (Equation 1) and the synthesization process (Equation 2) are performed on one frame to be processed in predetermined units, and, as a result, the synthesized image data (YMIX) corresponding to the frame is obtained.

It should be noted that the predetermined units in which the 3D-NR processing is performed and the predetermined units in which the synthesization processing is performed may not match.

Figure 4:
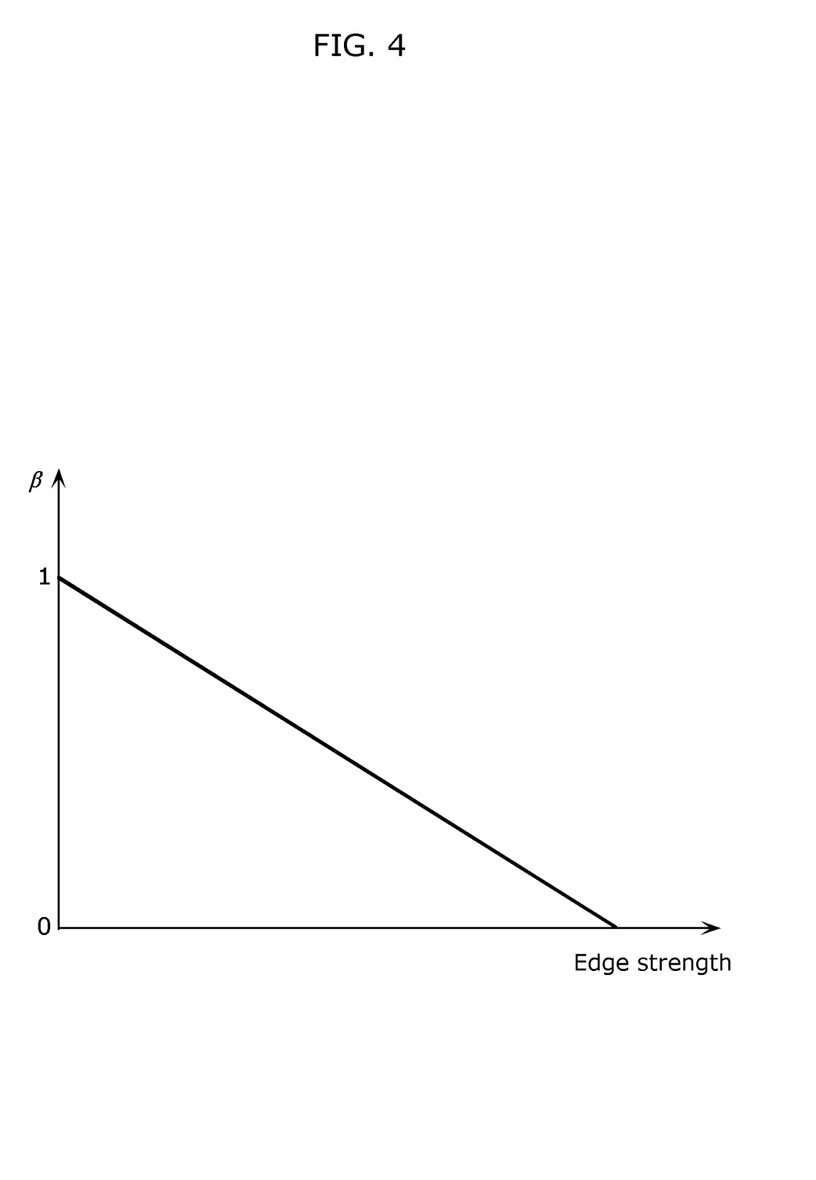
FIG. 4 is a diagram showing an example of a relationship between an edge strength and a coefficient $\beta$.

Here, in the present embodiment, the relationship between the edge strength and β satisfies the relationship shown in FIG. 4, for example. Specifically, the synthesization unit 203 stores synthesis ratio information which is a function or table indicating the relationship between the edge strength and β shown in FIG. 4, for example. In other words, the synthesization unit 203 can calculate β that corresponds to the edge strength inputted from the edge detection unit 204, based on the synthesis ratio information and the edge strength.

In other words, in the present embodiment, the synthesization unit 203 calculates β so that the greater the edge strength detected by the edge detection unit 204 is, the smaller β is.

This means that in synthesization of YIN and YOUT, the greater the edge strength in the image indicated by YOUT is, the greater the proportion of YOUT (1−β) indicated in the synthesis ratio of YIN and YOUT is. The reason why such processing is performed will be described below.

1-4. Reason Why Residual Image Reduces

The image processing device 160 according to the present embodiment can reduce the residual image which occurs due to the 3D-NR processing, by performing the processing according to the above-mentioned data flow, which will be described with reference to FIG. 5 to FIG. 8.

Figure 5:
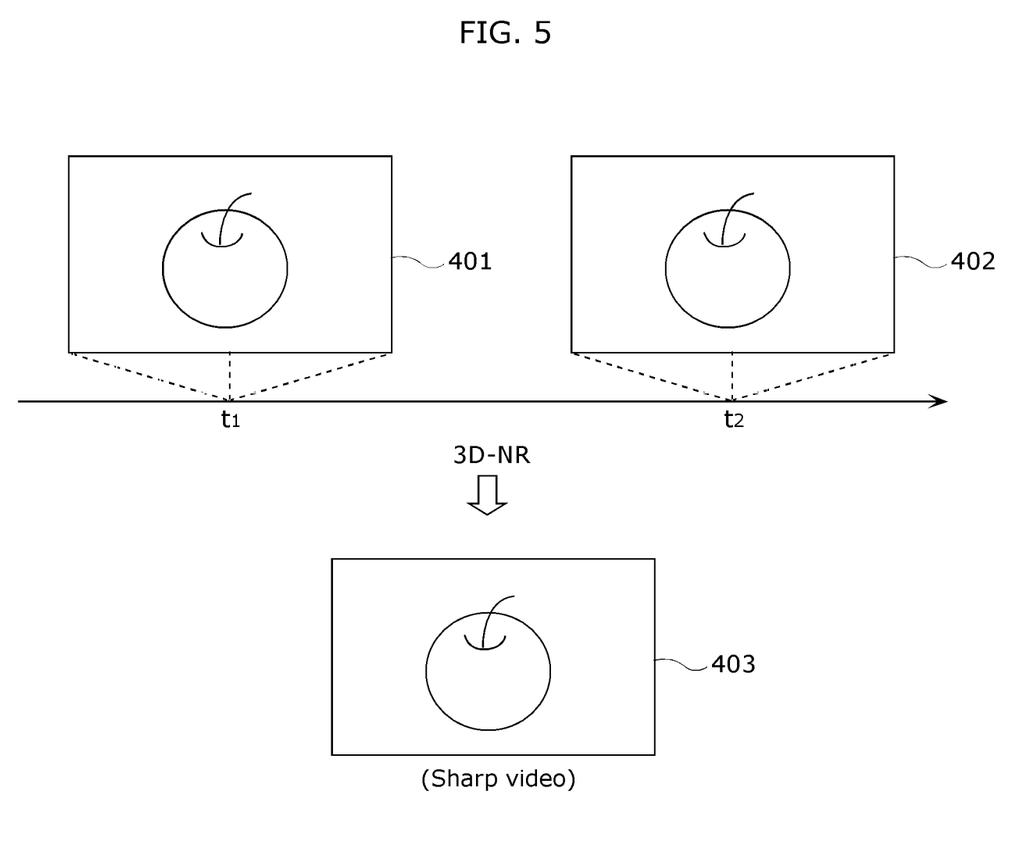
FIG. 5 is a diagram showing an example of a 3D-NR processed image when a subject is stationary.

FIG. 5 is a diagram showing an example of a 3D-NR processed image when a subject is stationary.

Figure 6:
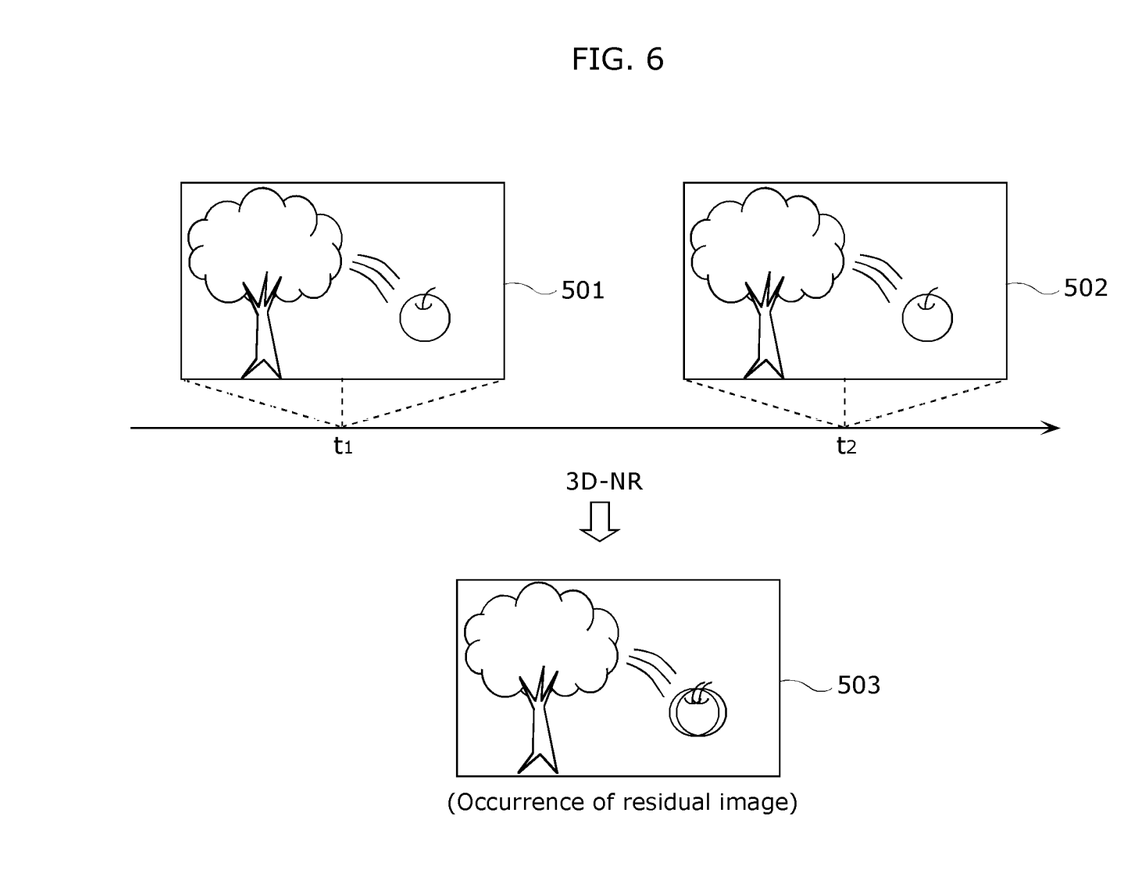
FIG. 6 is a diagram showing a first example of a 3D-NR processed image when a subject is moving.

FIG. 6 is a diagram showing a first example of a 3D-NR processed image when a subject is moving.

Figure 7:
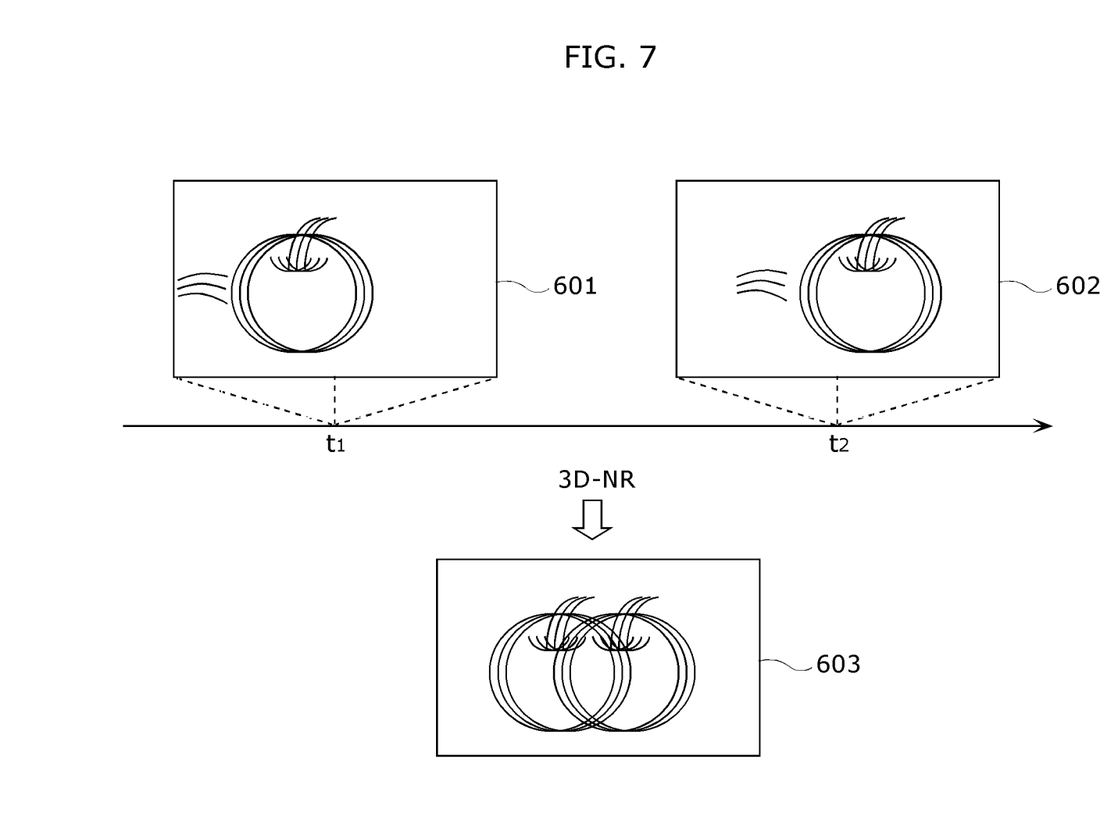
FIG. 7 is a diagram showing a second example of a 3D-NR processed image when a subject is moving.

FIG. 7 is a diagram showing a second example of a 3D-NR processed image when a subject is moving.

As shown in FIG. 5, the case is assumed where the 3D-NR processing (the processing described in section 1-2) is performed to reduce noise in the image 402, using an image 401 and an image 402 obtained by capturing images of the stationary subject (an apple) at temporally different times.

In other words, the case is assumed where an image corresponding to YMEM is the image 401 and an image corresponding to YIN is the image 402.

In this case, an image 403 obtained by performing the 3D-NR processing using the image 401 and the image 402 has reduced noise, and has no residual image of the subject in the image that is caused by the 3D-NR processing. In other words, a sharp image of the apple is obtained.

Meanwhile, as shown in FIG. 6, the case is assumed where the 3D-NR processing is performed to reduce noise in the image 502, using an image 501 and an image 502 which are obtained by capturing, at temporally different times, images of a scene in which some subject (apple) is moving.

In other words, the case is assumed where an image corresponding to YMEM is the image 501 and an image corresponding to YIN is the image 502.

In this case, in the image 503 obtained by performing the 3D-NR processing using the image 501 and the image 502, although noise is reduced, the residual image caused by the 3D-NR processing ends up occurred in the periphery of the subject the image of which is captured when the subject is moving.

This is because when the image of the moving subject is captured, a position of the subject in an image indicated by YIN ends up displaced from a position of the subject in an image indicated by YMEM. In other words, this is because the component of YIN ends up outputted at a spatial location at which the subject is originally not present in the image indicated by YMEM. As a result, the component of YIN appears as residual image in the image 503.

More specifically, as shown in FIG. 7, an image captured of a moving subject such as an image 601 and an image 602, has a low edge strength.

In addition, performing the 3D-NR processing using images having low edge strengths such as the image 601 and the image 602 results in generating an image such as an image 603 in which residual image is appeared to a greater extent as compared to the images before the 3D-NR processing is performed using the same.

As can be seen from the above, the relationship between the movement of the subject and the edge strength is strong. Specifically, if the image is captured when the subject is moving, the edge strength corresponding to the subject in the image decreases, and if the image is captured when the subject is stationary, the edge strength corresponding to the subject in the image increases.

Thus, in the above processing flow according to the present embodiment, the image data YOUT and the image data YIN are synthesized by changing, based on the edge strength in the image indicated by the 3D-NR processed image data YOUT, the synthesis ratio of the 3D-NR processed image data YOUT and the image data YIN before the 3D-NR processing. This reduces the volume of residual image occurred.

Figure 8:
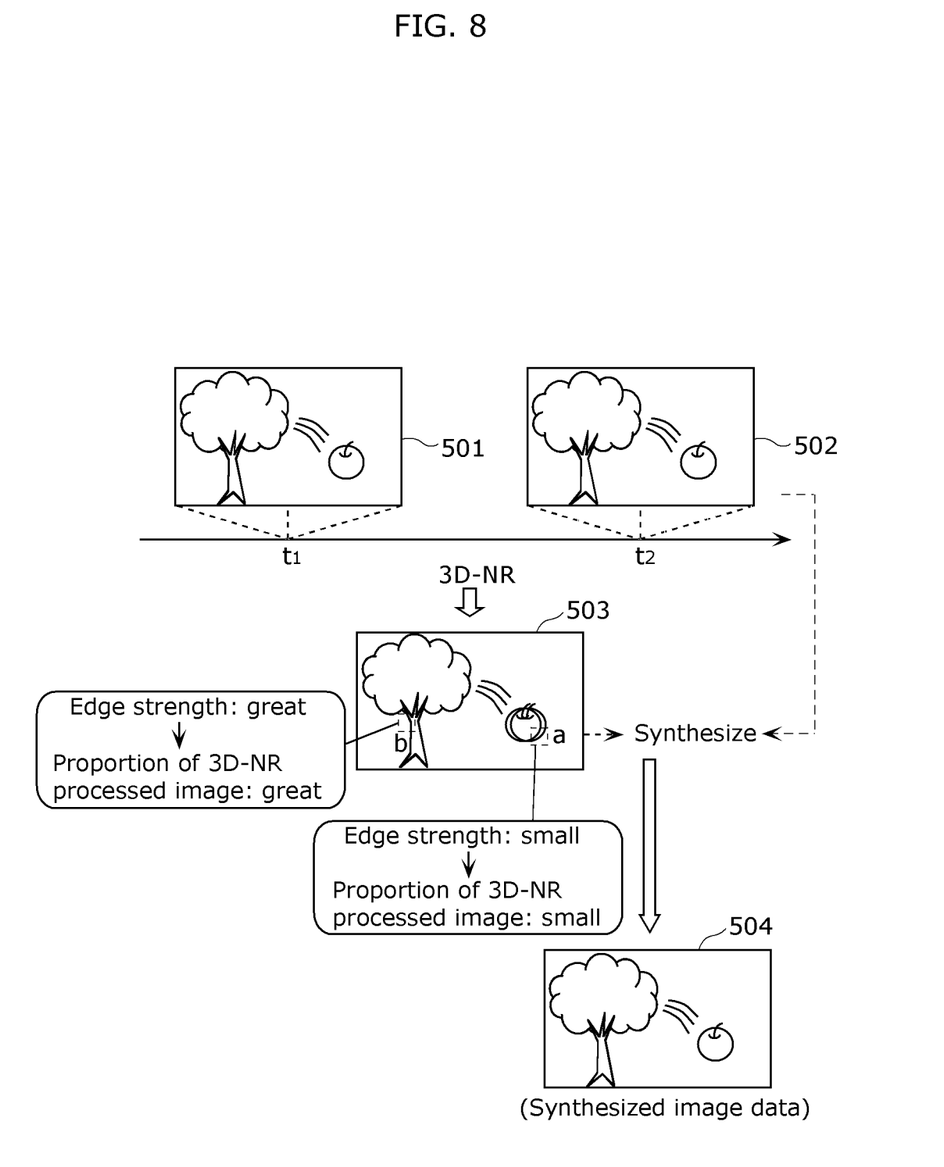
FIG. 8 is a diagram showing an example of a result of processing performed by the noise reduction unit.

FIG. 8 is a diagram showing an example of a result of the processing performed by the noise reduction unit 161 included in the image processing device 160 according to the embodiment.

As described above, performing the 3D-NR processing on the image 502, using two images (501 and 502) captured of the scene which includes the moving subject (apple) results in occurrence of the residual image in the periphery of the subject in the image 503 which is the result of the 3D-NR processing.

However, the noise reduction unit 161 according to the present embodiment synthesizes the image 502 to be made to undergo the 3D-NR processing and the image 503 which is the result of the 3D-NR processing, by changing the synthesis ratio depending on a region in the obtained image so that residual image is reduced.

For example, taking image data of a region a which is a portion of the residual image as an example, the image data has a relatively low edge strength in an image of the region a. Thus, a relatively large value is employed as β. In other words, a relatively small value is employed as a proportion (1−β) of the image 503 indicated in the synthesis ratio (see Equation 2 and FIG. 4).

As a result, the region a has a high proportion of the component of the image 502 (corresponding to YIN) which is the image before the 3D-NR processing and in which no residual image caused by the 3D-NR processing is included. Thus, the residual image in an image 504 indicated by YMIX, which is the synthesized image data, is reduced to a greater extent than the volume of the residual image in the image 503 which is the result of the 3D-NR processing.

For example, taking image data of a region b which is a portion of the stationary subject as an example, the image data has a relatively high edge strength in an image of the region b. Thus, a relatively small value is employed as β indicated in the synthesis ratio. In other words, a relatively large value is employed as a proportion (1−β) of the image 503 (see Equation 2 and FIG. 4).

As a result, the region b has a high proportion of the component of the image 503 (corresponding to YMEM) which is an image the noise therein is reduced by the 3D-NR processing. This reduces noise in the image 504 indicated by YMIX which is the synthesized image data.

As described above, the noise reduction unit 161 according to the present embodiment can suppress the occurrence of residual image which is caused by the 3D-NR processing in an image, while reducing noise in the image by the 3D-NR processing.

2. Complement to Embodiment

The embodiment according to the present disclosure is described above. The present disclosure, however, is not limited to the above embodiment. Thus, some complement to the embodiment will be described.

In the above embodiment, the CMOS image sensor 140 is illustrated by way of example of imaging means included in the imaging unit 101. However, the present disclosure is not limited thereto. For example, the imaging means may be implemented by a charge coupled device (CCD) image sensor or a negative channel metal oxide semiconductor (NMOS) image sensor.

Moreover, the image processing device 160 and the controller 180 may be implemented using a semiconductor chip or separate semiconductor chips.

Moreover, the 3D-NR processing performed by the 3D-NR unit 201 is not limited to a particular method. While YOUT (past YOUT) stored in the buffer 170 is used as YMEM for the subsequent 3D-NR processing (see FIG. 2) in the present embodiment, the 3D-NR unit 201 may use, for example, two of YIN which are continuously obtained, instead of YMEM, and perform the 3D-NR processing to reduce noise in one of YIN.

Moreover, the relationship between the edge strength and β may not be in proportional to each other as shown in FIG. 4.

Figure 9:
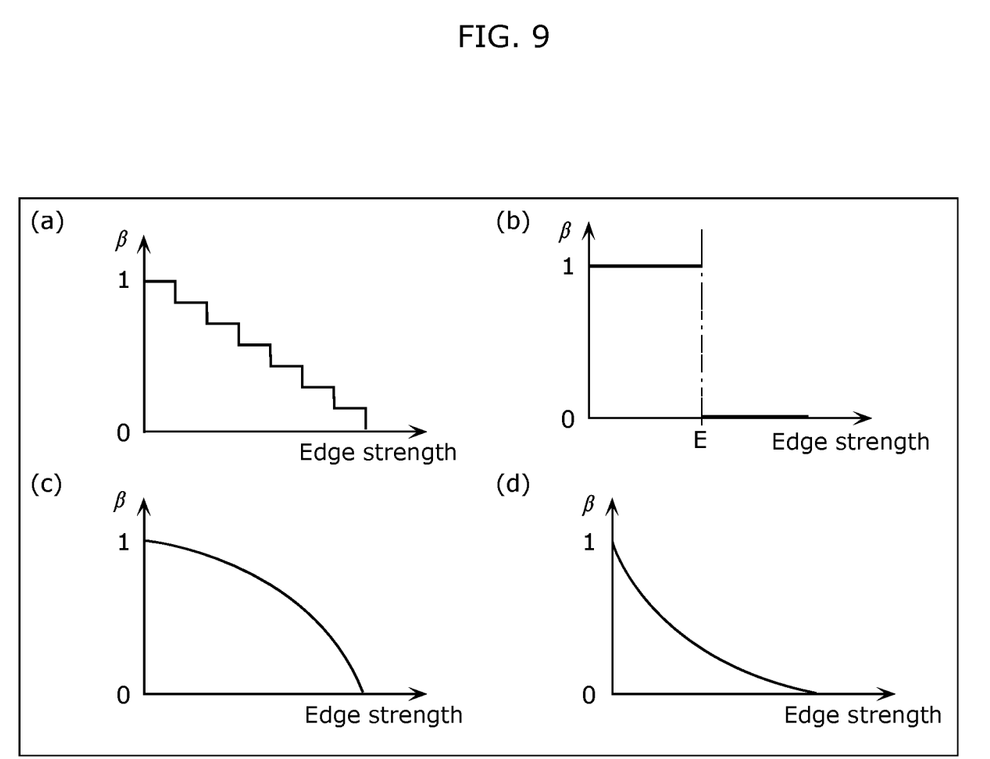
FIG. 9 is a diagram showing various examples of a relationship between the edge strength in YOUT and a proportion ($\beta$) of YIN indicated in a synthesis ratio.

FIG. 9 is a diagram showing various examples of the relationship between the edge strength in YOUT and the proportion (β) of YIN indicated in the synthesis ratio used for synthesizing YIN and YOUT.

For example, as the edge strength increases, β may decrease in a stepwise manner as shown in (a) of FIG. 9, instead of continuously decreasing.

Moreover, as shown in (b) of FIG. 9, β may be either one of two step values "0" and "1". For example, if the edge strength is less than or equal to a threshold E, β may=1, and if the edge strength is greater than the threshold E, β may=0.

In other words, briefly, if the edge strength is less than or equal to the threshold E, the synthesization unit 203 may output only the inputted image data (YIN) as the synthesized image data, and, if the edge strength is greater than the threshold E, the synthesization unit 203 may output only the 3D-NR processed image data (YOUT) as the synthesized image data (see Equation 2).

As described above, limiting the possible values of β to a plurality of step values reduces synthesization processing load in the synthesization unit 203, for example.

It should be noted that when β is either "0" or "1", either YIN or YOUT is employed as the synthesized image data (YMIX) in units of the synthesization processing by the synthesization unit 203. Thus, it is conceivable that a difference in image quality between YIN and YOUT may be prominent at a boundary between a region where YIN is employed and a region where YOUT is employed in YMIX corresponding to one frame.

However, employing a relatively small unit such as pixel to pixel, as a unit of the synthesization processing, allows the difference in image quality between YIN and YOUT, which is visually perceivable in YMIX, to be kept to a substantially insignificant extent.

Moreover, the relationship between the edge strength and β is not necessarily represented by a linear function (a linear line) in a two-dimensional plane formed by an edge strength axis and a β axis. For example, the relationship between the edge strength and β may be represented by a curve.

For example, as shown in (c) of FIG. 9, the greater the edge strength is, the greater the reduction rate of β (a decreasing value of β per unit length in the horizontal direction) may be.

In this case, β has a relatively large value while, for example, the edge strength is about an intermediate level. Thus, the proportion of YIN component is greater than the proportion of YOUT component in YMIX which is the result of synthesization of YIN and YOUT. In other words, the suppressive effect on the occurrence of residual image caused by the 3D-NR processing in YMIX improves.

Moreover, for example, as shown in (d) of FIG. 9, the greater the edge strength is, the lower the reduction rate of β may be.

In this case, β has a relatively small value while, for example, the edge strength is about an intermediate level. Thus, the proportion of the component of YOUT is greater than the proportion of the component of YIN in YMIX which is the result of synthesization of YIN and YOUT. In other words, the effects by the 3D-NR processing to reduce noise to be present in YMIX improves.

As described above, the relationship between the edge strength and β may be any insofar as being negatively correlated to each other, for example. In other words, β according to the edge strength may be determined so that the edge strength and the proportion of YOUT (1−β) indicated in the synthesis ratio (β:1−β) is positively correlated.

In other words, if the detection result obtained by the edge detection unit 204 indicates a second edge strength greater than a first edge strength, the synthesization unit 203 may determine the synthesis ratio so that the proportion of YOUT (1−β) indicated in the synthesis ratio (β:1−β) is greater than that when the detection result indicates the first edge strength.

Moreover, the proportion of the rate of change in β to the rate of change in edge strength (for example, the slope of the edge strength versus β shown in FIG. 4) may dynamically change according to the image-capturing environment.

Figure 10:
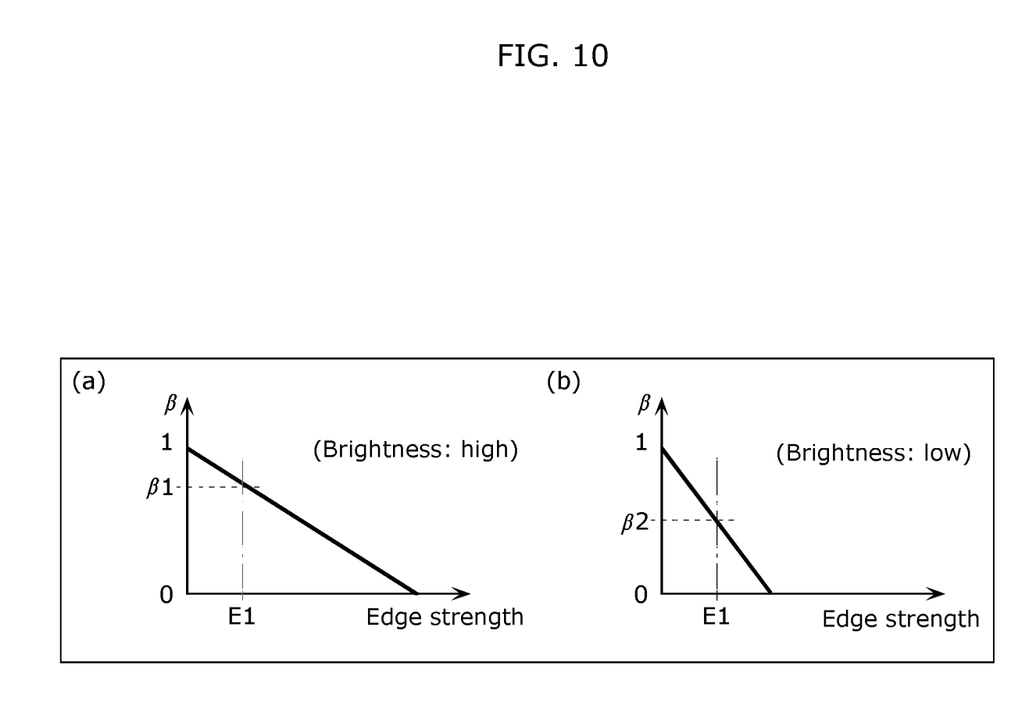
FIG. 10 is a diagram illustrating the relationship between the edge strength and $\beta$ when a proportion of a rate of change in $\beta$ to a rate of change in edge strength dynamically changes.

FIG. 10 is a diagram illustrating the relationship between the edge strength and β when the proportion of the rate of change in β to the rate of change in edge strength dynamically changes.

The following cases are assumed: a case where, for example, the image-capturing environment for the digital video camera 100 is environment A that is relatively bright such as the outdoor in fine weather; and a case where the image-capturing environment is environment B that is relatively dark such as the outdoor in cloudy weather.

In this case, in general, image data having a high brightness is obtained as the result of capturing an image in the environment A, and image data having a low brightness is obtained as the result of capturing an image in the environment B.

In other words, in general, the outline of a subject shown in the image obtained in the environment B is not as sharp as the outline of the subject shown in the image obtained in the environment A.

Thus, the lower the brightness of YOUT, from which the edge strength is to be detected, is, the lower the slope of the edge strength versus β is set (the angle of negative slope is increased) as shown in (a) and (b) of FIG. 10, for example.

In other words, when the brightness indicated in YOUT is a second brightness lower than a first brightness, the synthesization unit 203 may determine the synthesis ratio so that the proportion of YOUT in the synthesis ratio corresponding to the edge strength indicated by the detection result obtained by the edge detection unit 204 has a greater value than that when the brightness is the first brightness.

Because of this, even when the outline of the subject is not sharp, the synthesized image data (YMIX) in which noise in the outline portion is reduced by the 3D-NR processing is outputted.

For example, the case is assumed where due to a fact that the environment for capturing an image of the subject is dark, the edge strength in the outline portion of a certain subject has E1 which is a relatively small value.

In this case, when the relationship between the edge strength and β is as shown in (a) of FIG. 10, β1 which corresponds to E1 and is a relatively large value is calculated as the proportion of YIN indicated in the synthesis ratio used for synthesizing YIN and YOUT.

On the other hand, when the relationship between the edge strength and β is as shown in (b) of FIG. 10, β2 smaller than β1 is calculated as the proportion of YIN corresponding to E1.

In other words, the proportion of YOUT (1−β) which is the 3D-NR processed image data has a larger value in the synthesis ratio with respect to the outline portion of the subject in the case of (b) shown in FIG. 10 than the case of (a) shown in FIG. 10.

Thus, the image of the outline portion in which noise is reduced by the 3D-NR processing can be obtained as the synthesization result, even when the outline of the subject is not sharp in YOUT because of, for example, relatively dark image-capturing environment.

Briefly, the lower the brightness of YOUT is, the lower the slope of the edge strength versus β is set (the angle of negative slope is increased), thereby increasing the sensitivity in recognizing the outline of the subject. As a result, with respect to the image captured in relatively dark environment, reduction of noise by the 3D-NR processing and suppression of the occurrence of residual image caused by the 3D-NR processing are achieved in a balanced manner.

It should be noted that the brightness of YOUT may be identified using one or more pixel values of YOUT, or, using one or more pixel values of YIN or YMEM.

Moreover, instead of using the pixel values of YOUT and the like, the brightness of YOUT may be identified using, for example, information acquired from a device external to the image processing device 160, such as setting values of the diaphragm 300 included in the digital video camera 100 or brightness information from a sensor which detects the brightness of the image-capturing environment.

As described above, the digital video camera 100 according to the present embodiment includes the image processing device 160 and, using the noise reduction unit 161, the image processing device 160 can reduce noise by the 3D-NR processing and reduce residual image caused by the 3D-NR processing.

It should be noted that each of the components in the embodiment may take the form as dedicated hardware or may be implemented by executing a software program suitable for each component. Each component may be implemented by, CPU (Central Processing Unit) or a program execution unit, such as processor, loading and executing a software program stored in a hard disk or a recording medium such as a semiconductor memory. Here, the software program for implementing the image processing device according to the embodiment is as follows.

In other words, the program causes a computer to execute the following image processing method: an image processing method including: performing, using first image data and second image data which are obtained by capturing images at temporally different times, three-dimensional noise reduction (3D-NR) processing for reducing noise in the first image data; detecting an edge strength in an image indicated by processed image data which is image data on which the 3D-NR processing has been performed; determining, based on a result of the detection, a synthesis ratio of the first image data and the processed image data; synthesizing the first image data and the processed image data, using the determined synthesis ratio; and outputting synthesized image data obtained by the synthesization.

While the image processing device according to only one or more exemplary embodiments of the present disclosure has been described based on the exemplary embodiment, the present disclosure is not limited to the exemplary embodiment. Various modifications to the present embodiments that may be conceived by those skilled in the art and combinations of components of different embodiments are intended to be included within the scope of the one or more exemplary embodiments, without departing from the spirit of the one or more exemplary embodiments.

For example, the noise reduction unit 161 may be included as an image processing device in a device other than the digital video camera 100.

For example, the noise reduction unit 161 may be included as an image processing device for reducing noise and residual image in a mobile terminal, a stationary device, or the like that has imaging functionality.

Moreover, for example, the present disclosure may be achieved as an image processing device which performs the series of processing steps (for example, see FIG. 3) on image data to be outputted from a digital video camera that does not include the noise reduction unit 161.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

Industrial Applicability

The present disclosure is applicable to image processing devices for reducing noise and residual image in imaging devices such as digital video cameras, mobile phone cameras, and smartphones.

The invention claimed is:

1. An image processing device comprising:
   an image processor that:
   (i) performs, using first image data and second image data obtained by capturing images at temporally different times, three-dimensional noise reduction (3D-NR) processing for reducing noise in the first image data;
   (ii) detects an edge strength in an image indicated by the 3D-NR processed image data;
   (iii) determines, based on the detected edge strength, a synthesis ratio of the first image data which has not been subject to the 3D-NR processing and the 3D-NR processed image data; and
   (iv) synthesizes the first image data and the 3D-NR processed image data, using the determined synthesis ratio and outputs synthesized image data obtained by synthesizing the first image data which has not been subject to the 3D-NR processing and the 3D-NR processed image data,
   wherein, when the detected edge strength indicates a second edge strength greater than a first edge strength, the image processor determines a proportion of the 3D-NR processed image data indicated in the synthesis ratio to have a greater value than a proportion when the detected edge strength indicates the first edge strength.

2. The image processing device of claim 1,
   wherein the image processor determines the synthesis ratio to have a greater proportion of the 3D-NR processed image data indicated in the synthesis ratio as the edge strength indicated in the detected edge strength increases.

3. The image processing device of claim 1,
   wherein, when a brightness indicated in the 3D-NR processed image data is a second brightness lower than a first brightness, the image processor determines the proportion of the 3D-NR processed image data in the synthesis ratio that corresponds to the detected edge strength to have a greater value than the proportion when the brightness is the first brightness.

4. The image processing device of claim 1,
   wherein the first image data is image data in a predetermined unit that is included in one of two frames obtained by capturing the images at temporally different times and the second image data is image data in the predetermined unit that is included in the other of the two frames, and
   the image processor, for each predetermined unit, determines the synthesis ratio and synthesizes the first image data and the 3D-NR processed image data to output synthesized image data corresponding to the one of the two frames.

5. The image processing device of claim 1,
   wherein the image processor performs the 3D-NR processing, using processed image data that is the second image data and has been outputted from the image processor before the 3D-NR processing is performed on the first image data.

6. An imaging device comprising:
   the image processing device of claim 1; and
   an image sensor that captures images to obtain the first image data and the second image data.

7. An integrated circuit comprising:
   an image processor that:
   (i) performs, using first image data and second image data obtained by capturing images at temporally different times, three-dimensional noise reduction (3D-NR) processing for reducing noise in the first image data;
   (ii) detects an edge strength in an image indicated by the 3D-NR processed image data;

(iii) determines, based on the detected edge strength, a synthesis ratio of the first image data which has not been subject to the 3D-NR processing and the 3D-NR processed image data; and (iv) synthesizes the first image data and the 3D-NR processed image data, using the determined synthesis ratio and outputs synthesized image data obtained by synthesizing the first image data which has not been subject to the 3D-NR processing and the 3D-NR processed image data, wherein, when the detected edge strength indicates a second edge strength greater than a first edge strength, the image processor determines a proportion of the 3D-NR processed image data indicated in the synthesis ratio to have a greater value than a proportion when the detected edge strength indicates the first edge strength.

8. An image processing method comprising:

performing, using first image data and second image data obtained by capturing images at temporally different times, three-dimensional noise reduction (3D-NR) processing for reducing noise in the first image data;

detecting an edge strength in an image indicated by the 3D-NR processed image data;

determining, based on the detected edge strength, a synthesis ratio of the first image data which has not been subject to the 3D-NR processing and the 3D-NR processed image data;

synthesizing the first image data which has not been subject to the 3D-NR processing and the 3D-NR processed image data, using the determined synthesis ratio; and outputting synthesized image data obtained by the synthesization, wherein, when the detected edge strength indicates a second edge strength greater than a first edge strength, the image processor determines a proportion of the 3D-NR processed image data indicated in the synthesis ratio to have a greater value than a proportion when the detected edge strength indicates the first edge strength.

* * * * *